United States Patent
Laye et al.

(10) Patent No.: US 10,810,652 B2
(45) Date of Patent: Oct. 20, 2020

(54) BUNDLING OF REMOTELY-ORDERED GROCERY ITEMS

(71) Applicants: Alexica T. Laye, Fresno, TX (US); Jade O. Laye, Fresno, TX (US)

(72) Inventors: Alexica T. Laye, Fresno, TX (US); Jade O. Laye, Fresno, TX (US)

(*) Notice: Subject to any disclaimer, the term of this patent is extended or adjusted under 35 U.S.C. 154(b) by 399 days.

(21) Appl. No.: 15/599,729

(22) Filed: May 19, 2017

(65) Prior Publication Data

US 2018/0336623 A1    Nov. 22, 2018

(51) Int. Cl.
*G06Q 30/00*    (2012.01)
*G06Q 30/06*    (2012.01)

(52) U.S. Cl.
CPC ............... *G06Q 30/0635* (2013.01)

(58) Field of Classification Search
CPC .................................................. G06Q 30/0635
See application file for complete search history.

(56) References Cited

U.S. PATENT DOCUMENTS

2012/0030067 A1* 2/2012 Pothukuchi ............ G06Q 10/08
                                                              705/26.81
2016/0071190 A1* 3/2016 Voelz ................. G06Q 30/0635
                                                              705/26.81

OTHER PUBLICATIONS

One-stop shopping: Peapod expands ready-to-cook meal kits to deliver more meal solutions in every grocery order: Trusted brands from campbell soup company, kraft heinz and barilla extend variety. (Feb. 5, 2018). PR Newswire Retrieved from https://search.proquest.com/docview/1993989694?accountid=14753.*

* cited by examiner

*Primary Examiner* — Kathleen Palavecino

(57) ABSTRACT

The present disclosure provides various methods and embodiments for bundling remotely ordered grocery items. When a customer places a bundle request, the system determines whether a customer-defined number of the bundle items will be available at the customer-selected fulfillment time. If the system determines the customer-defined items will not be available at the fulfillment time, the bundle order is rejected and the user is alerted. Various other methods to assure complete fulfillment of customer orders are provided herein.

21 Claims, 3 Drawing Sheets

BUNDLING OF REMOTELY-ORDERED GROCERY ITEMS

FIELD OF THE INVENTION

The present disclosure generally relates to the fulfillment of groceries ordered remotely via an e-commerce platform and, more particularly, to systems and methods that provide for customer-specific bundling of remotely ordered groceries.

BACKGROUND

In recent years, many grocery chains have begun offering customers the option to order groceries over the Internet. The customer simply logs onto an e-commerce Internet portal and selects the items they wish to purchase. Once orders are placed, the customer selects a fulfillment time in which they will pick the groceries up at the merchant location. In-store personnel then pick the various items from the shelves a sufficient amount of time before the scheduled fulfillment time. When the customer arrives as scheduled, the groceries are then delivered to their vehicle.

The conventional remote ordering process is fraught with frustrations. For example, often times the customer will arrive to find that one or more of the desired grocery items were not available or were replaced with less-than desired or unwanted substitution items. Often times, the customer may have been depending on certain items being fulfilled for meals or other events later that same day. As a result, the customer is left scrambling to make last minute meal changes or make additional store visits in order to assemble all the desired items.

Figure 1:
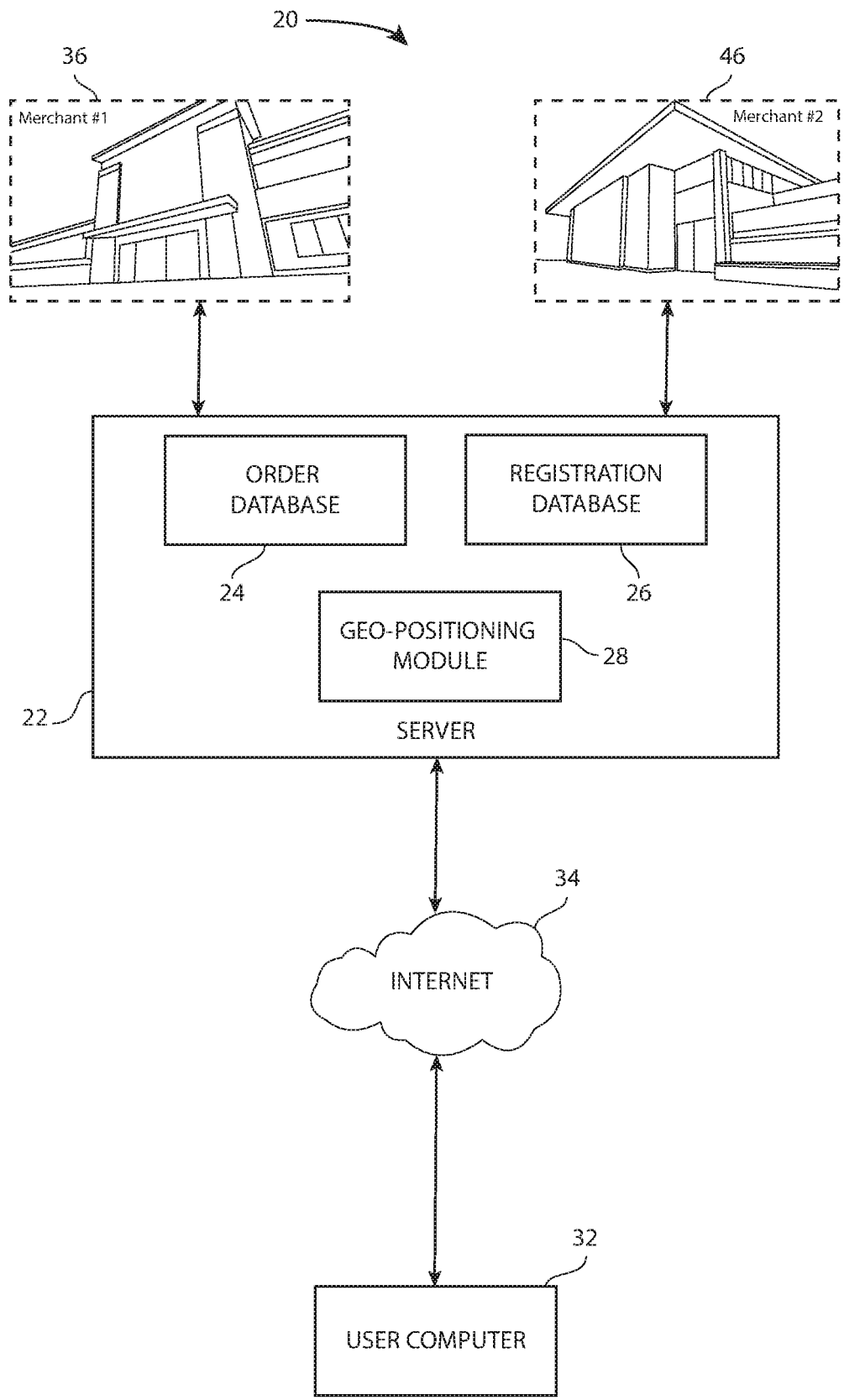
FIG. 1 illustrates a communications network for bundling remotely ordered grocery items, according to certain illustrative embodiments of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION OF ILLUSTRATIVE EMBODIMENTS

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those ordinarily skilled in the art having the benefit of this disclosure that these concepts may be practiced without these specific details. In some instances, well-known structures and components are shown in block diagrammatical form in order to avoid obscuring such concepts.

The present disclosure provides systems, methods, and non-transitory computer readable media for bundling remotely-ordered grocery items for fulfillment at a merchant location. A bundle, as defined herein, refers to a grouping of two or more grocery items in which a user-defined number of the grocery items must be fulfilled together at the same time. Grocery items, as defined herein, may be any variety of items such as, for example, food, animal goods, electronics, home goods, personal care items, clothing, etc. Thus, the merchant locations described herein may relate to a variety of merchant providers, such as, for example, grocers, electronic stores, distribution facilities, restaurants, cafes, etc. Therefore, although the present disclosure will focus on food items, the illustrative embodiments and methods described herein may be applied to a variety of other items of which a customer may desire to bundle.

In a first generalized method of the present disclosure, processing circuitry of a merchant location or server acquires a list of grocery items from a customer, whereby two or more of the grocery items have been categorized by the customer as a bundle. The grocery items may have been provided over a network to the merchant processing circuitry by a customer via an online e-commerce platform. Along with the bundle items, a fulfillment time associated with the bundle is also acquired. An order database communicably coupled to the processing circuitry then determines whether each grocery item in the bundle is available at the fulfillment time. When ordering in certain illustrative methods, the customer specifies a defined number of items which must be included in the bundle. The defined number of items may be all the bundle items, less than all the bundle items, some minimum number of the bundle items, etc. This defined number of items may also be a set number of items or specific brands, categories, etc. of items. Thus, the user is provided the option of specifying, within a bundle order, that certain items may be omitted or substituted. If the processing circuitry determines the defined number of the grocery items in the bundle will not be available at the fulfillment time, the bundle is rejected. Then, before the fulfillment time, the system alerts the customer the bundle has been rejected because the customer-defined number of grocery items will not be available at the fulfillment time. Accordingly, the customer will have notice well before the fulfillment time that the bundle items will not be available, thus giving the customer sufficient time to make alternate plans.

In a second generalized method of the present disclosure, merchant location or server processing circuitry again acquires a bundle request of grocery items from a customer via some remote e-commerce platform. The order database queries the store inventory to determine when the items in the bundle will be available to be fulfilled. Once determined, the processing circuitry communicates the fulfillment time to the customer over a network. Thus, in this illustrative method, the fulfillment time is determined by the availability of the bundle items at the desired merchant location. Thus, the customer can then make plans (e.g., meal plans) based upon inventory at his or her favorite local merchant, instead of being forced to make alternate plans or travel to other merchant locations.

In a third generalized method of the present disclosure, merchant location or server processing circuitry acquires a grocery item fulfillment time selected by a customer via a user device. The system then causes the user device to display to the customer only those grocery items that will be available at the fulfillment time. The user then selects from those items displayed the grocery items he or she requests at the selected fulfillment time. The server or merchant processing circuitry then receives the grocery request and fulfills it at the appointed time.

FIG. 1 illustrates a communications network for bundling remotely ordered grocery items, according to certain illustrative embodiments of the present disclosure. Communications network 20 may support operation on multiple carriers (e.g., waveform signals of different frequencies for wireless/wired communications). As an example, communications network 20 may be a multi-carrier LTE network capable of efficiently allocating network resources. Communications network 20 is one example of a network to which various aspects of the disclosure apply.

In the illustrated example, communications network 20 includes a server 22 which contains various processing circuitry/computing devices, databases, modules, etc., to facilitate bundling and fulfillment of grocery orders. Server 22 includes an order database 24, a registration database 26, and a geo-positioning module 28. Order database 24 is communicably coupled to inventory databases at merchant locations 36,46 and/or stores data relating to inventory at the one or more merchant locations 36,46 available for sale, customers, customer orders, delivery addresses, etc. The inventory data accessible by order database 24 may include present and future inventory scheduled to arrive to the merchant location via, for example, Just-in-Time inventory schedules, as well has historical demand trends for various inventory items. Registration database 26 stores user registration data required to transact business on communications network 20.

Geo-positioning module 28 may receive and/or process user location information so that orders may be delivered to user locations or delivered curb-side when the user arrives at the merchant location to pick up the items, in certain illustrative embodiments. When a customer places an order, geo-positioning module 28 may automatically determine the location of the customer and recommend one or more merchant locations to fulfill the order. For example, if the fulfillment method is delivery, geo-positioning module may analyze the bundle items (e.g., frozen items, yogurt, non-perishable items) and determine one or more merchant locations in close vicinity or miles away which can fulfill the bundle order via delivery means. In doing so, geo-positioning module 28 may consider the location, traffic patterns, weather conditions, etc., surrounding the candidate merchant locations, to thereby calculate the time it will take to deliver the bundle via air craft or automobile and then, based on the specific bundle items, determines which merchant locations are best suited to fulfill the order. Alternatively, if the fulfillment method is pickup, geo-positioning module 28 may determine the closest merchant location and suggest the recommendation to the user (e.g., if the user does not specify a merchant location via user computer 32).

Still referencing FIG. 1, when a user desires to place a remote grocery order via communications network 20, user device/computer 32 may be used to access server 22 via an internet connection or other communications network 34. User computer may display an e-commerce application in which the user can select bundle items, desired merchant locations, fulfillment times, etc. via a suitable graphics interface. User computer 32 may take various forms such as, for example, a mobile device, laptop or other network-adapted computing device. User computer 32 may be location-aware, for example, by including circuitry and/or software to enable user computer 32 to determine its own location and communicate that location to server 22. For example, user computer 32 may include circuitry and/or software that enables it to be in communication with a geo-positioning system and geo-positioning module 28, or other such system that enables the communications network 20 to determine the location of user computer 32.

One or more merchant store locations 36,46 are communicably coupled to server 22. Merchant locations 36,46 may be, for example, a grocery store, retail clothing store, distribution center, or any other merchant location whereby inventory is available for customer fulfillment. Although not shown, merchant locations 36,46 include one or more computing devices which communicate with server 22 to facilitate fulfillment of customer orders. The data available to such computing devices may be, for example, present and future inventory and pricing information for that respective merchant location, Just-in-Time delivery schedules, historical demand trends for inventory items, etc.

When placing the order, the customer may specify the delivery address or the delivery address may be automatically associated with the customer account. In some illustrative methods, communications network 20 may determine which of merchant locations 36,46 should fill the order. Communications network 20 may provide for different order types, for example, groceries, flowers, liquor, catering, etc. and different fulfillment methods, for example, delivery or pick up. Further, in certain illustrative embodiments, communications network 20 via computer 32 determines and displays to the customer a set of available fulfillment windows or times that correspond to different combinations of order, service types, and merchant store locations. The fulfillment windows are time windows on a date when the bundle order can be delivered or picked up, which are selected by the customer. Alternatively, as described herein, the user may also select a fulfillment time. Nevertheless, the customer's bundle order is stored in the order database 24 of server 22, whereby bundle orders are accessible by computing devices located at merchant locations 36,46 or, alternatively, server 22 may communicate the bundle orders to computing devices at merchant locations 36,46.

In certain other illustrative embodiments, server 22 and merchant locations 36,46 are in a common geographic area, although not required. Consequently, order database 24 and registration database 26 of server 22 may contain data that is unique to that geographic area in terms of customer identification, goods and services available for sale. However, in those embodiments in which merchant locations 36,46 are distribution centers, for example, merchant locations 36,46 may be located anywhere, so long as bundle orders can be delivered timely (e.g., via automobile or aircrafts such as drones). Order database 24 may contain data relating to inventory items of the various merchant locations 36,46, customers, customer orders, customer addresses, etc. Registration database 26 contains member names, passwords and other information relating to the registration of users necessary to transact business on communications network 20.

In a generalized method of the present disclosure, a customer using computer 32 establishes a network connection via the internet 34 with server 22 and places a grocery bundle order according to the methods described herein. To place the order in one example, the user may access a e-commerce mobile application (via computer 32) which facilities bundle orders whereby the user may select two or grocery items they wish to bundle together, along with a desired fulfillment time, merchant location, and fulfillment method. For example, a customer may select the fulfillment method to be delivery or curb-side pickup. The bundle request data is then communicated to server 22, where order database 26 determines the availability of each item in the bundle at one or more merchant locations 36,46 and fulfillment time. To make this determination, order database 26 or other processing circuitry of server 22 may query the inventory database of merchant locations 36,46 or may rely on data resident in order database 26 (which may be updated in real-time to reflect current and/or future inventory of merchant locations 36,46). Upon the query, server 22 receives data relating to present and future inventory and arrival times of merchant inventory, so that a determination can be made whether the bundle items will be available at the future fulfillment time.

If order database 26 determines a defined number of the grocery items in the bundle will not be available at the fulfillment time, order database 24 will reject the bundle order. In certain illustrative methods, the defined number of grocery items is defined by the customer when the bundle order is placed. For example, when the customer selects the bundle items via user computer 32, the customer may also select the items that must be included in the bundle order (i.e., the defined number). For example, the defined number may be 3 items in a 5 item bundle. In such a case, the bundle will be fulfilled as long as the defined 3 items are available. If the defined 3 items are not available, the bundle order is rejected and, therefore, is not communicated to the customer-selected or suggested merchant location 36,36 for fulfillment. Note also that the defined number of bundle items may be all items in the bundle. In such cases, the bundle order will not be fulfilled unless all items in the bundle are available at the fulfillment time. Thereafter, server 22 communicates over Internet 34 to user computer 32 to alert the customer the bundle has been rejected because the defined number of grocery items will not be available at the fulfillment time. The alert may take various forms such as, for example, a text message, email, chime, audible voice, vibration or flashing light.

If, however, server 22 determines all the required bundle items will be available at the fulfillment time, the bundle order is communicated to merchant locations 36,46, whereby the orders are placed. At the customer-selected fulfillment time, the orders are fulfilled. In certain methods, the orders are fulfilled via curb-side delivery whereby the customer arrives to pick up the bundle at the fulfillment time. In other illustrative methods, the bundle orders are fulfilled via delivery to a customer-defined location (e.g., via automobile, drones, etc.) at the fulfillment time.

In an alternative generalized method of the present disclosure, the customer may place a bundle order over communications network 20 are previously discussed. The bundle order is then acquired by server 22 over Internet 34. In this method, however, server 22 queries order database 24 to determine if the customer-defined number of the bundle items will be available at a merchant location 36,46. Note, as in all methods described herein, if the fulfillment method is pickup, the customer-selected merchant store is typically the fulfillment location. However, if the fulfillment method is delivery, server 22 may query all merchant locations 36,46 within suitable distance to fulfill the order. For example, certain bundle items may be assembled from one merchant location, while other bundle items are assembled from another merchant location, and then assembled as a single bundle ready for fulfillment (such example bundle assembly methods are especially useful with the use of drones traveling to and fro between merchant locations). Nevertheless, after server 22 determines the fulfillment times in which the bundle items will be available, those fulfillment times are communicated to user computer 32. The customer may then select which pickup or delivery time and/or location is acceptable via computer 32. Thereafter, the bundle items are fulfilled accordingly.

In certain other illustrative embodiments, the customer is allowed to select a bundle rejection cutoff time when placing a bundle order. Here, communications network 20 via customer computer 32 allows the user to select a cutoff time by which the customer must be alerted the bundle order will not fulfilled. For example, the bundle rejection cutoff time and date may be a few hours or a day before the selected fulfillment time.

The various components of communications network 20 may take a variety of forms in which to achieve the methods described herein. For example, one or more of user computer 32, merchant locations 36,46 and server 22 may include transceivers, memory, processors, user interfaces, databases, etc., which may be in direct or indirect communication with each other. The transceivers may include a modem subsystem and a radio frequency ("RF") unit and be configured to communicate bi-directionally with other devices or network elements. The memory of various elements may include a cache memory (e.g., a cache memory of the processor), random access memory ("RAM"), magnetoresistive RAM ("MRAM"), read-only memory ("ROM"), programmable read-only memory ("PROM"), erasable programmable read only memory ("EPROM"), electrically erasable programmable read only memory ("EEPROM"), flash memory, solid state memory device, hard disk drives, other forms of volatile and non-volatile memory, or a combination of different types of memory. In an embodiment, the memory of various network elements may include a non-transitory computer-readable medium having one or more hardware processors coupled thereto to achieve any of the methods described herein.

The memory of various network elements may store instructions that, when executed by a processor, cause the processor to perform the operations described herein in connection with embodiments of the present disclosure. Instructions may also be referred to as code. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The processors may include a central processing unit ("CPU"), a digital signal processor ("DSP"), an application-specific integrated circuit ("ASIC"), a controller, a field programmable gate array ("FPGA") device, another hardware device, a firmware device. Etc. Further, the user interface (on user computer 32, e.g.) may be used to display one or more grocery items, bundle categorizations, fulfillment times, alert types, elements of information, and any other application data according to embodiments of the present disclosure. The user interface may also include one or more lights (e.g., LEDs) separate from a touchscreen, a vibration generator, a speaker, a microphone, input for a mouse, input for a keyboard, etc. useful for providing feedback to a user as well as receiving further input therefrom when placing bundle orders or otherwise.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps or blocks described herein may be changed, combined into composite steps, and/or separated into sub-steps to provide features described herein.

Figure 2:
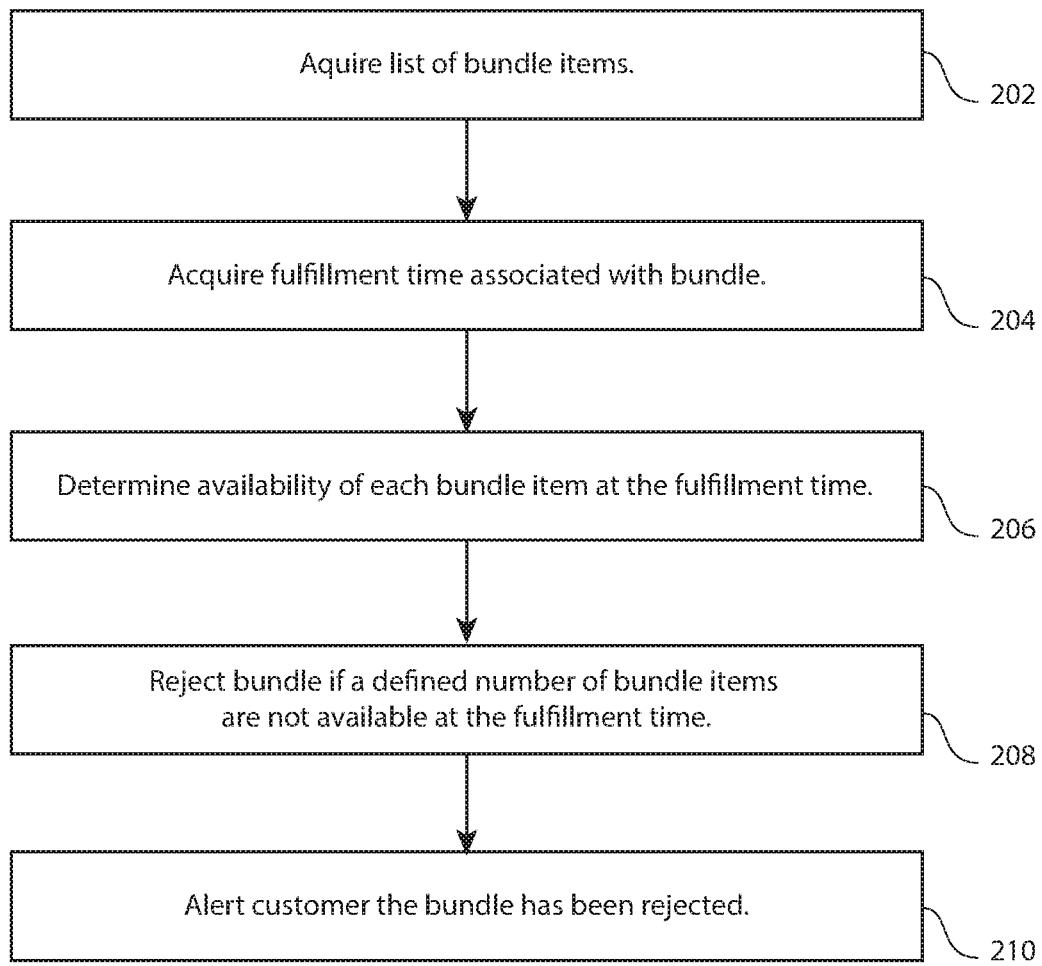
FIGS. 2 and 3 are flow charts of methods for bundling groceries remotely ordered by a customer over a communications network, according to alternative illustrative methods of the present disclosure.

In view of the foregoing, FIG. 2 is a flow chart of a method 200 for bundling groceries remotely ordered by a customer over a communications network, according to certain illustrative methods of the present disclosure. With reference to FIGS. 1 and 2, at block 202, server 22 acquires a list of grocery items from a customer, whereby two or more of the grocery items have been categorized by the customer as a bundle. As previously stated, the grocery items may be food, clothing, electronics, household goods, etc. For example, the customer may specify the bundle order as a meal bundle, whereby each grocery items will be included in the meal later that day or week. To begin method 200, a customer, via user computer 32, may access an e-commerce website or mobile application via a graphical user interface ("GUI") located on user computer 32. The e-commerce website displays a list of inventory items located at one or more merchant locations and provides the user with the option of selecting two or more of the grocery items as a bundle to be fulfilled together at the same fulfillment time. The user is also allowed to select a fulfillment time or time windows, as well as a delivery method. In this light, at block 204, server 22 also receives the customer-selected fulfillment time and fulfillment method associated with the bundle order.

At block 206, server 22 determines whether the selected merchant location has the customer-defined number of grocery items in the bundle available at the fulfillment time. In certain illustrative methods, the merchant location may be selected by the user or may be selected by communications network 20 based upon, for example, the location of a user identified using geo-positioning module 28. Nevertheless, to determine what inventory is available and at what fulfillment times, server 22 communicates with order database 24 and merchant locations 36,46 to query their local inventory database systems. At block 208, in the event server 22 determines that the customer-defined number of grocery items in the bundle will not be available at the fulfillment time, server 22 rejects the bundle order. As previously described, the user may, for example, indicate how many grocery items must be included in the bundle (i.e., the "defined number") when the order is placed via user computer 32. For example, the define number could be 3 items: hamburger buns, ground beef, and mayonnaise. Thus, in this example, if the buns, ground beef and mayonnaise are not available in the inventory at the selected fulfillment time, then server 22 rejects the bundle order.

At block 210, server 22 then alerts the customer/user over internet 34 that the bundle has been rejected because the defined number of grocery items will not be available at the fulfillment time. The user is alerted before the fulfillment time in order to give the user time to make alternate plans. In certain illustrative methods, the user may select the desired alert time when the order is placed, as some time period before the fulfillment time (also referred to herein as a "bundle rejection cutoff time"). The alert may come in the form of a text, email, audible alert on a mobile phone, or some indicator on the customer's e-commerce account.

In certain other illustrative methods, in the event the bundle items are not available at the customer-selected fulfillment time, server 22 queries order database 24 to determine when the bundle item would be available at one or more merchant locations 36,46. For example, perhaps the buns and ground beef are available, but the mayonnaise does not arrive in inventory until some later time. As previously described, order database 24 has access to present and future inventory data and delivery times and, thus, server 22 is able to determine when all the items will be available for fulfillment (also referred to as "second fulfillment time"). This second fulfillment time is then communicated to the customer over internet 34 and to user computer 32, whereby the customer is then able to accept or reject the second fulfillment time. If accepted, server 22 fulfills the bundle order at the second fulfillment times.

The fulfillment methods and times may vary in the illustrative methods described herein. The fulfillment methods may be, for example, pickup or delivery. The delivery methods may be via automobile or an aircraft, such as a drone. The fulfillment times, of course, would then be the pickup or deliver time associated with the bundle order.

In certain other illustrative methods, at block 206 above, server 22 may query order database 24 in a variety of ways in order to determine whether each grocery item in the bundle order is present in the merchant's inventory. For example, when placing the bundle order via user computer 32, the user can specify certain brands of grocery bundle items required to be included in the bundle order. For example, a certain brand of cheese may be selected. Alternatively, the user may select a specific food category. Here, the user may select hotdogs, soda, or yogurt as a food category that must be included in the bundle. In response, server 22 queries the merchant locations 36,46 to determine if they have those customer-specified brands or categories to be included in the bundle order. Thereafter, server 22 then determines whether the bundle order is rejected or fulfilled, as described above.

In yet other illustrative methods, at block 206 above, the customer may select preferred and substitute items for certain bundle items. For example, in the case of hotdogs being included in the bundle order, the user may select a "preferred" hotdog brand and a "substitution" hotdog brand. If server 22 determines the preferred brand item is not available in the inventory of merchant locations 36,46, the bundle order may still be fulfilled as long as the substitution item is available.

In other illustrative methods, when placing orders, the customer may include both bundle and non-bundle items in his or her order. For example, the customer may select certain items as a meal bundle that must be included together, along with other unrelated items which do not have to be bundled together. Therefore, server 22 will only fulfill the bundle order if all (or the defined number of) bundle items are available in inventory. At the same time, the non-bundle orders will be fulfilled regardless of whether the bundle items are available or not. Thus, in certain cases, only the non-bundle items will be fulfilled while the bundle order is rejected because one or more of the bundle items were not available.

Figure 3:
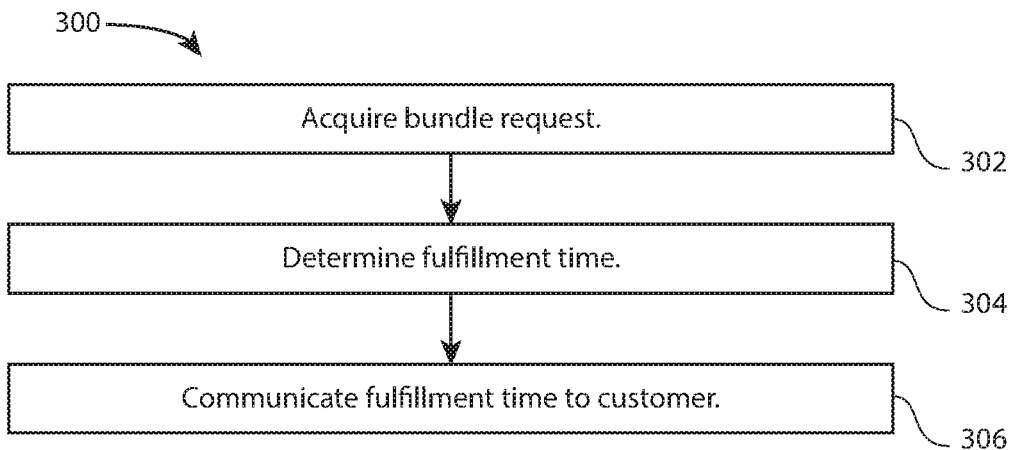

FIG. 3 is a flow chart of an alternative method for bundling grocery items remotely ordered by a customer, according to certain illustrative methods of the present disclosure. With reference to FIGS. 1 and 3, at block 302, server 22 acquires a list of grocery items from a customer, whereby two or more of the grocery items have been categorized by the customer as a bundle. As previously stated, the grocery items may be food, clothing, electronics, household goods, etc. To begin method 300, a customer, via user computer 32, accesses an e-commerce website or mobile application via a GUI, whereby they are allowed to select from a variety of inventory items at merchant locations 36,46, and bundle desired items as described herein. Unlike method 200, in method 300 the customer does not select a fulfillment time. Instead, after the user selects the bundle items, they are communicated to server 22 over internet 34, where server 22 determines the fulfillment time for the bundle items at merchant locations 36,46 based upon their respective inventories, at block 304. In certain illustrative methods, the merchant locations may be selected by the customer, while in other methods the merchants locations are selected by server 22 based upon the geo-position of the customer determined using geo-positioning module 28. Thereafter, at block 306, server 22 communicates the fulfillment time to user computer 32 over internet 34. Therefore, in this illustrative method, the inventory schedules of merchant locations 36,46 determine the fulfillment time of the bundle orders.

As previously described herein, in certain illustrative methods the user may select preferred and substitute bundle items when placing their order on user computer 32. With regard to method 300, when server 22 receives the bundle request data, the merchant locations 36,46 are queried to determine inventory availability and server 22 determines a first fulfillment time associated with the preferred grocery items in the bundle. Alternatively, server 22 may also determine a fulfillment time associated with the substitute grocery items, which may or may not be the same of the fulfillment time associated with the preferred grocery items. In yet another illustration, server 22 determines a fulfillment time associated with the combination of the preferred and substitute grocery items, which may or may not be the same as the fulfillment times associated with either preferred or substitution items separately. One or all the different fulfillment times may then be communicated to user computer 32 and displayed accordingly at block 306, whereby the customer is able to select a desired fulfillment time and merchant location based upon his or her convenience.

Also at block 306, in yet other examples, the fulfillment times communicated to the customer may be different fulfillment times for the same merchant location. Alternatively, server 22 may communicate different fulfillment times for different merchant locations.

Figure 4:
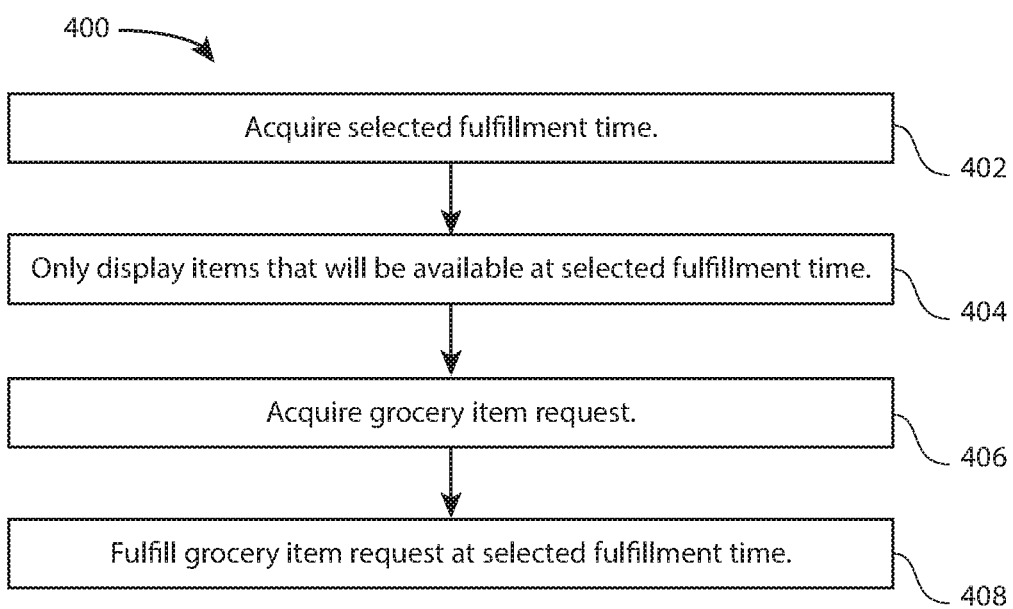
FIG. 4 is a flow chart of a method to fulfill grocery items remotely ordered by a customer, according to certain illustrative methods of the present disclosure.

FIG. 4 is a flow chart of a method 400 to fulfill grocery items remotely ordered by a customer, according to certain illustrative methods of the present disclosure. At block 402, a fulfillment time selected by a customer via user device 32 is acquired by server 22. Here, again, the customer selects the fulfillment time using an e-commerce application or other suitable platform as described herein. At block 404, server 22 queries the inventories of merchant locations 36,46, to determine which inventory items will be available at the selected fulfillment time. Then, server 22 communicates that inventory data to user computer 32 which only displays those grocery items which will be available at the selected fulfillment time. Thus, the user is only presented with the available inventory items and is thereby guaranteed to receive all his or her selected items at the fulfillment time. To achieve this, server 22 may query the databases of merchant locations 36,46 and their associated Just-in-Time delivery schedules in order to forecast which inventory items will be available at the fulfillment time. This forecast analysis may take into account one or more of real-time inventory data, historical demand for various items, fulfillment method speeds, anticipated weather patterns, etc. in order to determine which grocery items will be available at the selected time.

For example, in order to forecast the availability of items at the fulfillment time, communications network 20 may consider the historical demand for all inventory items at the requested fulfillment time, as well as the estimated arrival times per the Just-in-Time inventory schedules. In addition, in those cases when a customer selects a delivery fulfillment method, network 20 may also take into account the time it will take for those items to be delivered to a user by automobile, drone, etc. when determining if the item will be available. For example, if fulfillment of the requested items require items to be retrieved from different merchant locations, network 20 considers the time it would take for drones, for example, to travel to and fro between merchant locations to fulfill the orders. Nevertheless, once server 22 determines the items that are available at the user-selected fulfillment time, only those items are displayed to the customer on user computer 32. At block 406, the customer then places the grocery item request and the corresponding data is communicated to server 22 via internet 34. The grocery item request may be a bundle or non-bundle request. Thereafter, at block 408, the grocery item request is fulfilled at the customer-selected fulfillment time.

There are many advantages to the present disclosure. For example, when a user places a bundle order, he or she is assured the order will be fulfilled in its entirety, thus avoiding last minute plan alterations. If the order cannot be fulfilled, the user will be alerted well before the fulfillment time. In those methods using a fulfillment time in order to determine which inventory items to display to the user, the user is assured the items being viewed will be available at their selected fulfillment time.

Embodiments and methods described herein may combine any one or more of the following features: A computer-implemented method to bundle grocery items remotely ordered by a customer, the method comprising acquiring a list of grocery items from a customer, whereby two or more of the grocery items have been categorized by the customer as a bundle; acquiring, from the customer, a fulfillment time associated with the bundle; determining whether a merchant location has each grocery item in the bundle available at the fulfillment time; responsive to a determination that a defined number of the grocery items in the bundle will not be available at the fulfillment time, rejecting the bundle; and before the fulfillment time, alerting the customer that the bundle has been rejected because the defined number of grocery items in the bundle will not be available at the fulfillment time.

A computer-implemented method as defined in the previous paragraph, further comprising determining a second fulfillment time in which each grocery item in the bundle will be available at the merchant location; communicating the second fulfillment time to the customer; and responsive to customer acceptance of the second fulfillment time, fulfilling the bundle at the second fulfillment time, wherein the fulfillment time may be a customer pickup or delivery time.

Any of the computer-implemented methods as defined in the previous paragraphs, wherein the customer is alerted at a customer-specified alert time. The customer may also select a cutoff time by which the customer must be alerted the bundle has been rejected. To determine whether a merchant location has each grocery item in the bundle, the system performs a method comprising determining whether a customer-specified brand is available at the merchant location; or determining whether a customer-specified food category is available at the merchant location. In other examples, the bundle is a meal bundle.

Any of the computer-implemented method as defined in the previous paragraphs, wherein acquiring the list of grocery items comprises acquiring one or more substitution items for the bundle. In other examples, the list of grocery items includes one or more non-bundle items; and the method further comprises fulfilling the non-bundle items at the fulfillment time. In other examples, the defined number of grocery items is less than all items in the bundle.

In another illustrative example, a system described herein may comprise a non-transitory memory: and one or more hardware processors coupled to the non-transitory memory and configured to read instructions from the non-transitory memory to cause the system to perform any of the operations described herein.

In another illustrative example, a method described herein is a computer-implemented method to bundle grocery items remotely ordered by a customer, the method comprising acquiring a bundle request of grocery items from a customer; determining a fulfillment time when the bundle will be available; and communicating the fulfillment time to the customer. The bundle request from the customer comprises preferred and substitute grocery items. Communicating the fulfillment time comprises communicating a first fulfillment time associated with the preferred grocery items; communicating a second fulfillment time associated with the substitute grocery items; or communicating a third fulfillment time associated with a combination of preferred and substitute grocery items.

In other examples, communicating the fulfillment time comprises communicating different fulfillment times for different merchant locations. The bundle request may comprise a minimum number of grocery items to be included in the bundle, the minimum number being less than all items in the bundle.

In yet another example, a method described herein may be a computer-implemented method to fulfill grocery items remotely ordered by a customer, the method comprising acquiring a grocery item fulfillment time selected by a customer; displaying to the customer only those grocery items that will be available at the fulfillment time; acquiring a grocery item request from the customer, the grocery item request being comprised of grocery items selected from the displayed grocery items; and fulfilling the grocery item request at the fulfillment time.

Moreover, any of the methods described herein may be embodied within a system comprising processing circuitry to implement any of the methods, or a in a non-transitory computer-readable medium comprising instructions which, when executed by at least one processor, causes the processor to perform any of the methods described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art having the benefit of this disclosure will recognize that changes may be made in form and detail without departing from the scope of the present disclosure. Thus, the present disclosure is limited only by the appended claims.

What is claimed is:

1. A computer-implemented method to bundle grocery items remotely ordered by a customer, the method comprising:
    displaying, by a graphical user interface of a customer computer device, a list of grocery items whereby a customer can select two or more food items as a meal bundle, wherein the meal bundle includes data related to a first food item and a second food item the customer indicates must be fulfilled together at a fulfillment time selected using the graphical user interface;
    transmitting the meal bundle and fulfillment time over a communications network to a processor;
    querying, by the processor, an inventory database of a merchant location to determine whether the merchant location has the first and second food item available at the fulfillment time;
    responsive to a determination that the first and second food items in the meal bundle will not be available at the fulfillment time, rejecting the meal bundle;
    before the fulfillment time, transmitting an electronic alert over the communications network to the customer computer device to alert the customer that the meal bundle has been rejected because the first and second food items in the meal bundle will not be available at the fulfillment time;
    querying, by the processor, the inventory database of the merchant location to determine a second fulfillment time in which the first and second food items will be available at the merchant location;
    communicating to the customer, over the communications network, the second fulfillment time;
    responsive to customer acceptance of the second fulfillment time, automatically scheduling delivery of the meal bundle at the second fulfillment time; and
    delivering the meal bundle to the customer at the second fulfillment time, wherein the meal bundle is delivered to the customer at the merchant location or at a location remote from the merchant location.

2. The computer-implemented method as defined in claim 1, wherein the fulfillment time is a customer pickup or delivery time.

3. The computer-implemented method as defined in claim 1, wherein:
    the meal bundle further comprises data related to a customer-specified alert time in which the customer is to be alerted whether the meal bundle will be fulfilled; and
    the customer is alerted at the customer-specified alert time.

4. The computer-implemented method as defined in claim 1, wherein the customer selects a cutoff time by which the customer must be alerted the meal bundle has been rejected.

5. The computer-implemented method as defined in claim 1, wherein determining whether a merchant location has the first and second food items comprises:
    determining whether a customer-specified food brand is available at the merchant location; or determining whether a customer-specified food category is available at the merchant location.

6. The computer-implemented method as defined in claim 1, wherein acquiring the list of grocery items comprises acquiring one or more substitution items for the first or second food items.

7. The computer-implemented method as defined in claim 1, wherein:
the list of grocery items includes one or more non-meal bundle items; and
the method further comprises fulfilling the non-meal bundle items at the fulfillment time.

8. A system, comprising:
a non-transitory memory; and
one or more hardware processors coupled to the non-transitory memory and configured to read instructions from the non-transitory memory to cause the system to perform the operations comprising:
displaying, by a graphical user interface of a customer computer device, a list of grocery items whereby a customer can select two or more food items as a meal bundle, wherein the meal bundle includes data related to a first food item and a second food item the customer indicates must be fulfilled together at a fulfillment time selected using the graphical user interface;
transmitting the meal bundle and fulfillment time over a communications network to a processor;
querying, by the processor, an inventory database of a merchant location to determine whether the merchant location has the first and second food item available at the fulfillment time;
responsive to a determination that the first and second food items in the meal bundle will not be available at the fulfillment time, rejecting the meal bundle;
before the fulfillment time, transmitting an electronic alert over the communications network to the customer computer device to alert the customer that the meal bundle has been rejected because the first and second food items in the meal bundle will not be available at the fulfillment time;
querying, by the processor, the inventory database of the merchant location to determine a second fulfillment time in which the first and second food items will be available at the merchant location;
communicating to the customer, over the communications network, the second fulfillment time;
responsive to customer acceptance of the second fulfillment time, automatically scheduling delivery of the meal bundle at the second fulfillment time; and
delivering the meal bundle to the customer at the second fulfillment time, wherein the meal bundle is delivered to the customer at the merchant location or at a location remote from the merchant location.

9. The system as defined in claim 8, wherein the fulfillment time is a customer pickup or delivery time.

10. The system as defined in claim 8, wherein:
the meal bundle further comprises data related to a customer-specified alert time in which the customer is to be alerted whether the meal bundle will be fulfilled; and
the customer is alerted at the customer-specified alert time.

11. The system as defined in claim 8, wherein the customer selects a cutoff time by which the customer must be alerted the meal bundle has been rejected.

12. The system as defined in claim 8, wherein determining whether a merchant location has the first and second food items comprises:
determining whether a customer-specified food brand is available at the merchant location; or
determining whether a customer-specified food category is available at the merchant location.

13. The system as defined in claim 8, wherein acquiring the list of grocery items comprises acquiring one or more substitution items for the first or second food items.

14. The system as defined in claim 8, wherein:
the list of grocery items includes one or more non-meal bundle items; and
the method further comprises fulfilling the non-meal bundle items at the fulfillment time.

15. A non-transitory computer-readable medium having stored thereon machine-readable instructions executable to cause a machine to perform the operations comprising:
displaying, by a graphical user interface of a customer computer device, a list of grocery items whereby a customer can select two or more food items as a meal bundle, wherein the meal bundle includes data related to a first food item and a second food item the customer indicates must be fulfilled together at a fulfillment time selected using the graphical user interface;
transmitting the meal bundle and fulfillment time over a communications network to a processor;
querying, by the processor, an inventory database of a merchant location to determine whether the merchant location has the first and second food item available at the fulfillment time;
responsive to a determination that the first and second food items in the meal bundle will not be available at the fulfillment time, rejecting the meal bundle;
before the fulfillment time, transmitting an electronic alert over the communications network to the customer computer device to alert the customer that the meal bundle has been rejected because the first and second food items in the meal bundle will not be available at the fulfillment time;
querying, by the processor, the inventory database of the merchant location to determine a second fulfillment time in which the first and second food items will be available at the merchant location;
communicating to the customer, over the communications network, the second fulfillment time;
responsive to customer acceptance of the second fulfillment time, automatically scheduling delivery of the meal bundle at the second fulfillment time; and
delivering the meal bundle to the customer at the second fulfillment time, wherein the meal bundle is delivered to the customer at the merchant location or at a location remote from the merchant location.

16. The computer-readable medium as defined in claim 15, wherein the fulfillment time is a customer pickup or delivery time.

17. The computer-readable medium as defined in claim 15, wherein:
the meal bundle further comprises data related to a customer-specified alert time in which the customer is to be alerted whether the meal bundle will be fulfilled; and
the customer is alerted at the customer-specified alert time.

18. The computer-readable medium as defined in claim 15, wherein the customer selects a cutoff time by which the customer must be alerted the meal bundle has been rejected.

19. The computer-readable medium as defined in claim 15, wherein determining whether a merchant location has the first and second food items comprises:
   determining whether a customer-specified food brand is available at the merchant location; or
   determining whether a customer-specified food category is available at the merchant location.

20. The computer-readable medium as defined in claim 15, wherein acquiring the list of grocery items comprises acquiring one or more substitution items for the first or second food items.

21. The computer-readable medium as defined in claim 15, wherein:
   the list of grocery items includes one or more non-meal bundle items; and
   the method further comprises fulfilling the non-meal bundle items at the fulfillment time.

* * * * *